(12) United States Patent
Kim et al.

(10) Patent No.: US 11,398,628 B2
(45) Date of Patent: Jul. 26, 2022

(54) DEVICES AND METHODS FOR PREPARING A SLURRY AND COATING A SUBSTRATE WITH A SLURRY

(71) Applicant: AQORA LIMITED, Dublin (IE)

(72) Inventors: Yeong Woo Kim, Timonium, MD (US); Boris Gragera Moreno, Malahide (IE)

(73) Assignee: INITION ENERGY LTD., West Sussux (GB)

( * ) Notice: Subject to any disclaimer, the term of this patent is extended or adjusted under 35 U.S.C. 154(b) by 0 days.

(21) Appl. No.: 17/140,932

(22) Filed: Jan. 4, 2021

(65) Prior Publication Data
US 2021/0135227 A1 May 6, 2021

Related U.S. Application Data (63) Continuation of application No. 15/964,051, filed on Apr. 26, 2018, now abandoned.

(51) Int. Cl.
*H01M 4/00* (2006.01)
*H01M 4/62* (2006.01)
(Continued)

(52) U.S. Cl.
CPC .............. *H01M 4/625* (2013.01); *B01F 23/50* (2022.01); *B01F 31/651* (2022.01); *B05C 5/027* (2013.01);
(Continued)

(58) Field of Classification Search
CPC ..................................................... H01M 4/00
See application file for complete search history.

(56) References Cited

U.S. PATENT DOCUMENTS 4,087,209 A 5/1978 Mahig
5,776,238 A * 7/1998 Kerwin ............... C09B 67/0017
106/505

(Continued)

FOREIGN PATENT DOCUMENTS

JP 11339816 A * 12/1999

OTHER PUBLICATIONS

"Conveying Advanced Li-ion Battery Materials into Practice The Impact of Electrode Slurry Preparation Skills", Alexander Kraytsberg and Yair Ein-Eli, Adv. Energy Mater. 2016, 6, 1600655. (Year: 2016).*

*Primary Examiner* — David P Turocy
*Assistant Examiner* — Mohammad Mayy
(74) *Attorney, Agent, or Firm* — Nixon Peabody LLP; Justin D. Swindells (57) ABSTRACT

Devices and methods for preparing a slurry for coating onto a substrate. The devices and methods of the present disclosure relate to providing a slurry in a closed volume with at least one passage. The slurry includes a solvent, a powder, and a binder. The slurry can also include a dispersion agent. The slurry is forced repeatedly under high pressure through the at least one passage in a first flow direction and then back through the at least one passage in a second flow direction, opposite the first flow direction. The forcing homogenously disperses the powder and the binder within the solvent. Both sides of the substrate are then coated simultaneously with the slurry extruded from the closed volume after the forcing. Curing of the coated slurry includes freeze drying to preserve the porosity of the slurry on the substrate.

9 Claims, 4 Drawing Sheets

(51) Int. Cl.
*H01M 4/04* (2006.01)
*C09D 127/18* (2006.01)
*C09D 5/24* (2006.01)
*B05C 9/04* (2006.01)
*B05C 11/10* (2006.01)
*B05C 5/02* (2006.01)
*B01F 23/50* (2022.01)
*B01F 31/65* (2022.01)
*C08K 3/04* (2006.01)
*B01F 101/50* (2022.01)

(52) U.S. Cl.
CPC .......... *B05C 9/04* (2013.01); *B05C 11/1044* (2013.01); *C09D 5/24* (2013.01); *C09D 127/18* (2013.01); *H01M 4/0404* (2013.01); *H01M 4/0411* (2013.01); *H01M 4/623* (2013.01); *B01F 23/565* (2022.01); *B01F 2101/50* (2022.01); *C08K 3/04* (2013.01); *C08K 2201/001* (2013.01)

(56) References Cited

U.S. PATENT DOCUMENTS

| | | |
|---|---|---|
| 6,528,210 B1 | 3/2003 | Oertel |
| 6,544,688 B1* | 4/2003 | Cheng .................. H01M 4/668 |
| | | 429/234 |
| 2002/0101785 A1 | 8/2002 | Edwards |
| 2002/0146623 A1 | 10/2002 | Suzuki |
| 2004/0247927 A1* | 12/2004 | Kurz ...................... B32B 15/01 |
| | | 428/608 |
| 2012/0101577 A1 | 4/2012 | Lee |
| 2012/0285151 A1 | 11/2012 | Schmid |
| 2013/0011746 A1 | 1/2013 | Tatsumisago |
| 2013/0323527 A1 | 12/2013 | Matsunaga |
| 2014/0004437 A1* | 1/2014 | Slocum ............ H01M 8/04201 |
| | | 429/443 |
| 2014/0304982 A1 | 10/2014 | Morishima |
| 2017/0065308 A1 | 3/2017 | O'Halloran |
| 2017/0172848 A1 | 6/2017 | Goodman |

* cited by examiner

DEVICES AND METHODS FOR PREPARING A SLURRY AND COATING A SUBSTRATE WITH A SLURRY

CROSS-REFERENCE TO RELATED APPLICATIONS

The present application is a continuation of U.S. Non-Provisional patent application Ser. No. 15/964,051, filed Apr. 26, 2018, and entitled "Devices and Methods for Preparing a Slurry and Coating a Substrate with a Slurry," which is incorporated by reference in its entirety.

TECHNICAL FIELD

The present disclosure is directed to devices and methods for preparing a slurry and coating the slurry onto a substrate.

BACKGROUND

Forming slurries containing powders and optionally binders dispersed within a solvent often involves considerable energy and equipment. Such is the case when forming slurries for the manufacture of substrates used in forming electrodes for batteries. For example, in conventional wet electrode coating processes, viscous slurries containing powders, like carbon black powder or other active/non-active materials, and organic polymers as binders, are coated onto substrates to form current collectors by drawing or delivering either the slurries or the substrates via various methods, such as doctor blades, roll-to-roll coaters, etc. Conventional devices used in wet coating require a large amount of space because of the required use of the doctor blades, the roll-to-roll coaters, etc. All of the devices and workstations related to the conventional mixing, kneading, coating, and drying are massive.

Long periods of time also are required to mix the slurries by using conventional planetary mixers. Typically, a large amount of toxic solvents also is used in the slurries for conventional wet coating to aid in the formation and application of the slurries onto the substrate. Such toxic solvents include, for example, n-methyl-2-pyrrolidone (NMP), dimethylformamide, dimethylacetamide, etc. After coating the slurry on the substrate, the toxic solvents must be removed. Removal requires elaborate evaporation techniques in the drying process to prevent environmental pollution and explosions. Bulky dryers with long belt conveyors combined with heating systems are required for the drying to evaporate the toxic solvents. Along with drying systems, it is necessary to install systems for collecting the evaporated toxic solvents to prevent environmental pollution.

Dry coating processes are an alternative to wet coating for the manufacture of electrodes. However, dry coating has several drawbacks. For example, it is necessary to pulverize dried carbon composite powder into fine powder for coating, which requires two machines to pulverize and distribute the fine powder onto the substrate. Specific hoppers and complex arrangements of coaters also are required to disperse the fine powder onto the substrate.

Dry coating also suffers from inconsistent results of battery performance based on the irregular distribution of the fine powder on the substrate. The resultant unevenness of powder density on the substrate has a direct effect on many issues, like the adhesive force between the coating and the substrate and the porosity uniformity, which eventually leads to lack of reaction uniformity. Even with specially designed powder coating machines equipped with sophisticated distributors, the same kind of problems of inconsistent cell performance exist.

Accordingly, needs exist for coating devices and coating processes that decrease the issues mentioned above in slurry formation in general, and as applied to battery electrode manufacturing.

SUMMARY

An aspect of the present disclosure includes a process of coating a substrate with a slurry for forming an electrode. The slurry contains a powder. In some aspects, the powder can be formed of carbon black powder, or any conductive/non-conductive material or blends thereof. The slurry further contains one or more solvents and binders. The slurry can optionally include one or more dispersion agents. The process further includes freeze drying the coated substrate and heating the freeze-dried coated substrate under a vacuum at elevated temperatures to remove residual solvents. The process further includes calendering the resulting coated substrate to be used as battery electrodes.

A further aspect of the disclosure is a device configured to mix and knead a slurry, and then coat the slurry simultaneously on both sides of a substrate. The device includes two cylinders connected via a narrow tube, with a piston in each cylinder configured to repeatedly force the slurry back and forth between the cylinders and through the tube. The repeated movement of the slurry through the tube applies a shearing force to the slurry, which mixes and kneads the slurry. In some aspects, the device includes a die configured to extrude the slurry onto the substrate so that the slurry contacts both surfaces of the substrate simultaneously.

Another aspect of the present disclosure includes a method of coating a substrate including providing a slurry in a closed volume with at least one passage. The slurry includes a solvent, a powder, a binder, and a dispersion agent. The method further includes forcing the slurry repeatedly under high pressure through the at least one passage in a first flow direction and then back through the at least one passage in a second flow direction, opposite the first flow direction, to homogenously disperse the powder and the binder within the solvent. The method further includes coating both sides of the substrate simultaneously with the slurry extruded from the closed volume after the forcing.

Aspects of the present disclosure also include an electrode that is coated according to the above method, a battery having an electrode that is coated according to the above method, and a battery system having a plurality of battery cells, with each battery cell having an electrode that is coated according to the above method.

An additional aspect of the present disclosure includes a method of curing a coated substrate including providing a substrate coated on both sides with a slurry. The slurry includes a solvent, a powder, a binder, and a dispersion agent. The method further includes freezing at least the solvent and the dispersion agent coated on the substrate, and sublimating at least the solvent and the dispersion agent frozen on the substrate. The method further includes heating the substrate under vacuum to above the freezing points of the at least one solvent and the dispersion agent after the sublimating and calendering the substrate after the heating.

A further aspect of the present disclosure includes a system with a first cylinder assembly with a first cylinder and a first piston. The first piston is configured to reciprocally move within the first cylinder. The system also includes a second cylinder assembly with a second cylinder and a second piston. The second piston is configured to reciprocally move within the second cylinder. The system also includes a passage connecting the first cylinder assembly to the second cylinder assembly. In the operation of the system, the first cylinder assembly and the second cylinder assembly are configured to alternatingly apply compression and suction to a slurry within the first cylinder and the second cylinder to cause the slurry to reciprocally move through the passage.

These and other capabilities of the disclosed devices, systems, and methods will be more fully understood after a review of the following figures, detailed description, and claims.

While the devices, systems, and methods discussed herein are susceptible to various modifications and alternative forms, specific embodiments have been shown by way of example in the drawings and will be described in detail herein. It should be understood, however, that the description is not intended to be limited to the particular forms disclosed. Rather, the description is to cover all modifications, equivalents, and alternatives falling within the spirit and scope of the present disclosure as defined by the appended claims.

DETAILED DESCRIPTION

There is shown in the drawings and will herein be described in detail one or more embodiments of the device, system, and method with the understanding that the present disclosure is to be considered as an exemplification of the principles of the disclosed herein and is not intended to limit the broad aspects solely to the embodiments illustrated. For purposes of the present detailed description, the singular includes the plural and vice versa (unless specifically disclaimed); the word "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise. Every range of numbers disclosed herein includes the upper and lower numbers and every rational number, including every integer, therebetween.

Disclosed are devices and processes for preparing a slurry, and then applying the slurry onto a substrate. The devices and processes of the present disclosure significantly reduce the complexity and time required to form and apply the slurries to the substrate. Disclosed also are processes for curing substrates coated with the slurry. The disclosed devices and processes can be used in the manufacture of an electrode for a battery. However, the devices and processes can be used for the formation and application of any type of slurry onto any type of substrate, not specifically limited to a substrate intended for an electrode.

As applied to the manufacture of electrodes for batteries, the devices and methods of the present disclosure decrease or eliminate the use of toxic chemicals as solvents and/or dispersion agents, such as NMP, DMF, acetone etc., in the formation of slurries for electrodes. The devices and methods also shorten and simplify the overall process of battery electrode manufacturing by removing complicated conventional processes in the preparation of slurries, the treatment of substrates, the manipulation of equipment, and the like. The devices and methods also scale down the size or exclude the use of the expensive and massive devices used in condensation, pulverization, and powder distribution for the processes discussed above in the background.

In particular, the methods of the present disclosure use only one device, which performs all of the mixing, kneading, and coating. The device coats a slurry directly onto a substrate in situ, without the hassle of, for example, transferring the slurry from a mixing device to a coating device. The device also coats both sides of the substrate simultaneously. The methods also include freeze drying the coated substrate, which removes the solvents. The freeze drying helps reduce damage or changes in the pore structures of the slurry and substrate formed during coating. The present disclosure also provides a slurry coating process along with a coating device for the manufacture of an electrode for an electrochemical cell. The electrochemical cell can be, for example, a primary cell or a secondary cell, such as a lithium cell or a fuel cell.

The slurries of the present disclosure are formed of a solvent, a powder, and a binder. The slurries can also include a dispersion agent. In one or more embodiments, the solvent can be any chemical that can dissolve a binder, and any chemical can be chosen according to the desired binders' properties. For example, the solvent can be water with a water-soluble binder, such as polytetrafluoroethylene (PTFE). Alternatively, the solvent can be acetone (or nearly pure acetone), NMP, or DMF with a non-water soluble binder, such as polyvinylidene fluorine (PVDF) powder or resin. In one or more alternative embodiments, the solvent can be any chemical that can form a dispersion with the binder and the powder.

The powder can be any powder used in the manufacture of a dispersion. In one or more embodiments, the powder can be any powder used in the manufacture of an electrode. For example, the powder can be any electrochemically activatable, active, or inactive inorganic or organic material, or combinations thereof. When the powder is a conductive powder, the conductive powder serves as the electrode or the conductive additive within the electrode for an electrochemical cell. The conductive powder can be carbon black powder, graphite, carbon fibers, etc., or blends thereof. Other non-carbon powders can be, for example, silicon carbide (SiC), barium sulfate (BaSO$_4$), lithium iron phosphate (LiFePO$_4$), lithium manganese iron phosphate (LiMn-FePO$_4$), and various oxides, such as silicon dioxide (SiO$_2$), aluminum oxide (Al$_2$O$_3$), lithium nickel cobalt aluminum oxide (LiNiCoAlO$_2$), lithium nickel cobalt manganese oxide (LiNiCoMnO$_2$), lithium manganese oxide (LiMn$_2$O$_4$), lithium nickel manganese spinel (LiNi$_{0.5}$Mn$_{1.5}$O$_4$), lithium cobalt oxide (LiCoO$_2$), and the like, and other natural minerals, and combinations thereof.

The foregoing non-carbon powders are all water soluble and hydrophilic. Thus, in using water soluble and hydrophilic powders as described above, the ratio of the water-based solvent to the powder within the slurry can be lowered further down to about 0.6:1 by weight because of the mixing as described below and the material hydrophilicity. This is in contrast to the ratio for hydrophilic powders and water-based solvents in conventional wet methods, which is about 1.25:1 by weight. For the carbon-based powders, the ratio of solvent to powder within the slurry can be about 4.5-8:1 by weight. This provides an advantage over conventional slurries, which require solvent to powder ratios of about 24-27:1 by weight. Thus, significantly less solvent must be used in the methods of the present disclosure, which reduces the amount of solvent that must be removed during the cure.

The binder aids in adhering the powder to the substrate after coating and curing. In one or more embodiments, the binder can be a resin binder. The binder can be soluble within the solvent, such as being water soluble, or can be in the form of a dispersion, such as a water-based polytetrafluoroethylene emulsion. Specific binders that can be used in battery manufacture include, for example, sodium carboxymethyl cellulose (Na-CMC), poly(sodium acrylate) (PAA-Na), poly(ethylene oxide) (PEO), poly(vinylpyrrolidone) (PVP), polyethylene glycol (PEG), poly(3,4-ethylendioxythiophene), water-soluble acrylate (Acryl S020), polyvinyl alcohol (PVA), polyacrylamides and polymethylacrylamides, divyinyl ether-maleic anhydride, polyoxazoline, various types of polyphosphates used in tissue engineering, starch, liquid glucose, hydroxypropyl methyl cellulose (HPMC), hydroxypropyl cellulose (HPC), hydroxyethyl cellulose (HEC), carnauba wax, guar gum, xanthan gum (XG), pectin, and the like, and combinations thereof.

In the manufacture of an electrode, the amount of binder used in the slurry depends on how the binder affects the conductivity of the resulting electrode. In one or more embodiments, the ratio of binder to the powder within the slurry can be about 0.02:1 to about 0.1:1. However, the binder content of above about 10 wt % relative to the combined weight of the binder and the powder is not suitable for large-scale electrode production due to viscosity and energy-density considerations.

The dispersion agent aids in mixing hydrophobic inorganic components, such as carbon powders, with the water-based solvents and binders. In one or more preferable embodiments, the dispersion agent is selected to be in a liquid state and have similar or inferior physical properties to the solvent, such as lower melting/precipitating point. The similar or inferior physical properties of the dispersion agent compared to the solvent cause the dispersion agent to evaporate along with or before the solvent so that a resulting film on a substrate after freeze drying contains mainly the powder. For an example, isopropyl alcohol having precipitation point of −89° C. can be used with water as the solvent. Extra solvent residue, including a non-aqueous solvent, can be extracted during freeze drying, such as in a freeze dryer condenser at −60° C. to −80° C., or during the subsequent heating of the coated substrate at an elevated temperature, as further discussed below.

Dispersion agents that can be used within the slurry include, for example, isopropyl alcohol, ethanol, methanol, acetic acid, acetonitrile, acetone, NMP, DMF, and the like. Further, in one or more embodiments, some dispersion agents can also function as both the dispersion agent and the solvent. Further, although dispersion agents such as NMP and DMF are not preferably used because of their toxic qualities, they can still be used in slurries of the present disclosure because of the much lower required concentrations. For example, because of the benefits of the mixing and associated device discussed below, the amounts of these dispersion agents can be much lower than conventional wet methods, which still reduces the related expense of their use.

The amount of dispersion agent used in a slurry depends on the other components within the slurry, including the solvent. However, the slurry can be as low as 0.01 weight percent (wt %) dispersion agent. This is in contrast to conventional slurries mixed using conventional methods, which may be required to be up to 30 wt % dispersion agent in an aqueous solvent. For example, in a slurry of the present disclosure of carbon powder, water as the solvent, and PTFE emulsion as the binder, when isopropyl alcohol is used as the dispersion agent, the slurry is about 1 wt % isopropyl alcohol. When using NMP as the dispersion agent, the slurry can be as low as 0.01 wt % NMP.

Figure 1:
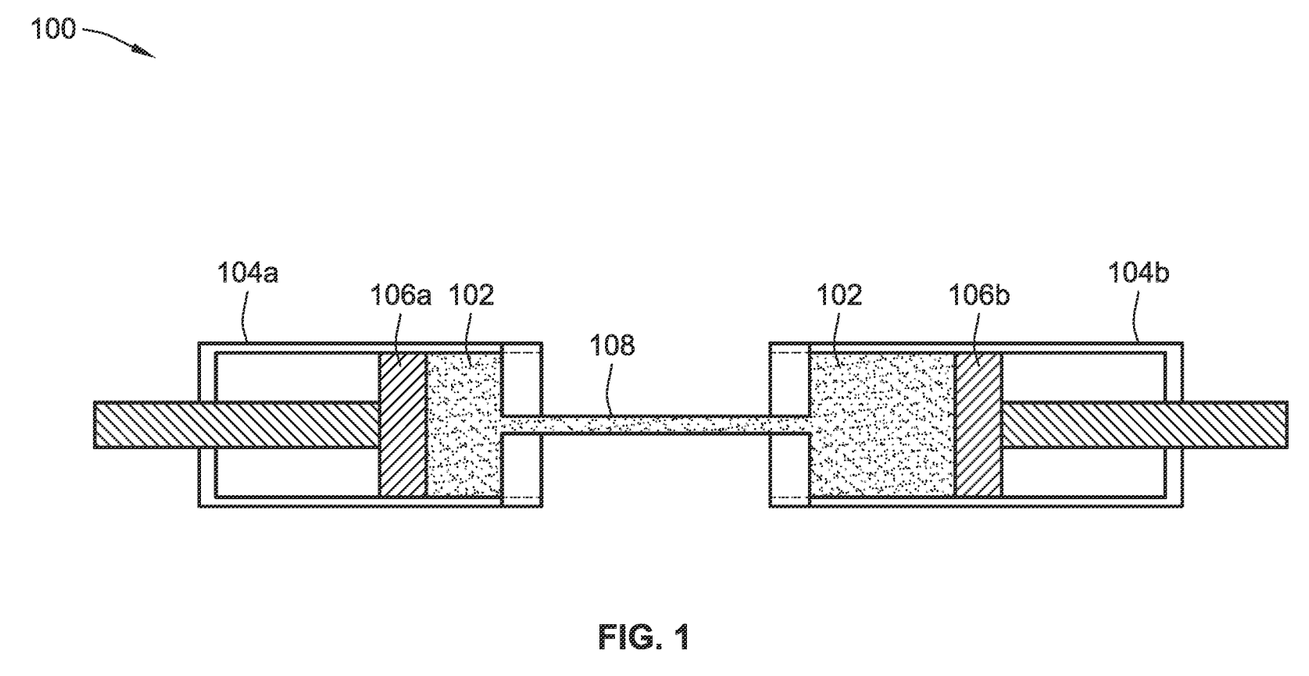
FIG. 1 illustrates a cross-sectional view of a device used to prepare a slurry, according to aspects of the present disclosure.

Referring to FIG. 1, illustrated is a cross-sectional view of a device 100 used to prepare a slurry 102 and coat the slurry 102 on a substrate, according to aspects of the present disclosure. The device 100 includes a pair of cylinders 104*a*, 104*b* and a pair of pistons 106*a*, 106*b*. Each piston 106*a*, 106*b* is within one of the cylinders 104*a*, 104*b* (e.g., piston 106*a* is within cylinder 104*a*, and piston 106*b* is within cylinder 104*b*). The pistons 106*a*, 106*b* are connected to one or more devices (not shown) that are configured to drive the pistons 106*a*, 106*b* in a linear and reciprocal movement along the length of the cylinders 104*a*, 104*b* (e.g., stroke length or direction), as indicated by the line A. In one or more embodiments, the one or more devices that drive the pistons 106*a*, 106*b* can be one or more linear actuators that can be controlled by a programmable drive. However, the one or more devices can be any type of mechanical and/or electromechanical device that can impart a reciprocal linear movement to the pistons 106*a*, 106*b*. Actuation of the pistons 106*a*, 106*b* is synchronized so that one piston applies a compressive force on the slurry 102 as the other piston applies a suction force.

The cylinders 104*a*, 104*b* are fluidically connected via a narrow tube 108. The narrow tube 108 allows the slurry 102 to flow between the cylinders 104*a*, 104*b* under the compressive forces generated by actuation of the pistons 106*a*, 106*b*. By actuating the pistons 106*a*, 106*b* within the cylinders 104*a*, 104*b* in a reciprocal movement, the slurry 102 can be repeatedly passed through the tube 108. Thus, the slurry 102 flows from cylinder 104*a* through the tube 108 and to cylinder 104*b* in a first flow direction, such as left to right in the direction of line A in FIG. 1. The slurry 102 then flows from cylinder 104*b* through the tube 108 and to cylinder 104*a*, such as right to left in the direction of line A in FIG. 1. The second flow direction is opposite to the first flow direction. Although the flow direction illustrated in FIG. 1 is linear along the line A, in one or more embodiments the flow direction can be non-linear. For example, the tube 108 can be in the shape of a U, an S, or have any number of the same and/or different bends that creates a tortuous path for the slurry 102 to travel.

The repeated movement of the slurry 102 through the tube 108 mixes the slurry 102. The mixing is aided further by the narrow diameter of the tube 108 as compared to, for example, the diameters of the cylinders 104a, 104b in the stroke directions of the pistons 106a, 106b or the direction of the flow (e.g., line A). The slurry 102 passing through the tube 108 experiences high shear forces rendered from the velocity disproportion of particles within the slurry 102 based on the particles at the edges of the tube 108 experiencing lower velocities than the particles at the center of the tube 108, according to the Bernoulli principle. The shear forces exerted while charging and/or discharging the cylinders 104a, 104b with the slurry 102 results in a high mixing efficiency and produces enormous kneading effects.

The mixing efficiency is dependent on the flow speed of the slurry 102 through the tube 108, the diameter of the tube 108, and the mixing time. The narrower the diameter of the tube 108 and the higher the flow speed of the slurry 102 through the tube 108, then the more effective the mixing and kneading. By way of example, a flow speed of 430 millimeters per second through a three-eighth inch inner diameter tube takes only 15 minutes of mixing. A flow speed of 380 millimeters per second through a three-eighth inch inner diameter tube takes only 25 minutes of mixing. And a flow speed of 170 millimeters per second through a one-eighth inch inner diameter tube takes only 10 minutes of mixing. In practice, the diameter of the tube 108 can be about $\frac{1}{16}$ to $\frac{1}{2}$ inch. Thus, the configuration of the device 100 provides for a higher mixing efficiency than conventional devices, such as conventional planetary mixers. For example, mixing 30 grams of carbon black powder takes only about 0.3 kilowatt-hours (kWh) of energy. For larger amounts of mixed material, the power consumed can be up to about 10 to 15 kilowatt-hours per kilogram of powder.

According to one example, a device 100 was formed of cylinders (i.e., cylinders 104a, 104b) having three-inch inner diameters. The cylinders were connected by a tube (i.e., tube 108) that was seven inches long and had a one-eighth inch inner diameter. A slurry (i.e., slurry 102) was moved between the cylinders forced by pistons (i.e., pistons 106a, 106b) at a piston speed of 1 millimeter per second for six-inch strokes. The slurry, which was formed of a carbon black-polymer blend, was completely mixed and kneaded by the reciprocal movement of the pistons and being forced through the tube in less than a half hour and ready for coating. However, the actual mixing and kneading times can vary depending on the size of particle, the size of tube 108 (e.g., inner diameter, length) and the speed of the pistons 106a, 106b and, therefore, the resulting speed of the slurry 102 passing through the tube 108.

Although only one tube 108 is shown connecting the cylinders 104a, 104b, in one or more embodiments there can be more than one tube 108 connecting the cylinders 104a, 104b. More than one tube 108 can be used when the diameter of the cylinders 104a, 104b in the stroke direction is large relative to the diameter of the tube 108.

The device 100 can be formed of one or more metals, metal alloys, or other materials (e.g., plastics). The material used for the device 100 can depend on the solvents used to form the slurry. With water as the main solvent of a slurry, the device 100 can be formed of a material resistant to corrosion by water and the other dispersion agents, such as 316 stainless steel.

In one or more embodiments, the device 100 can include a third cylinder. The third cylinder can be attached to one of the cylinders 104a, 104b and/or the tube 108. The third cylinder can be used to accumulate the slurry prior to coating the slurry onto a substrate, as discussed below. In one embodiment, the third cylinder can have any working volume larger than that of the cylinder 104a or 104b so that the third cylinder can accumulate the slurry 102 for coating later, after mixing, as described further below.

Figure 2A:
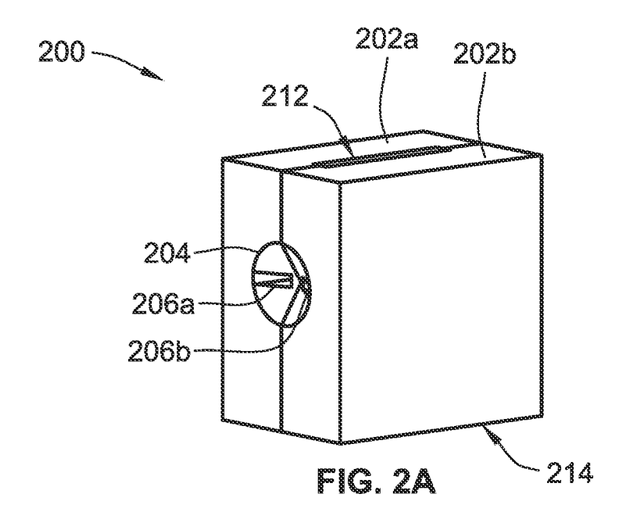
FIG. 2A illustrates a perspective view of a die assembly, according to aspects of the present disclosure.
Figure 2B:
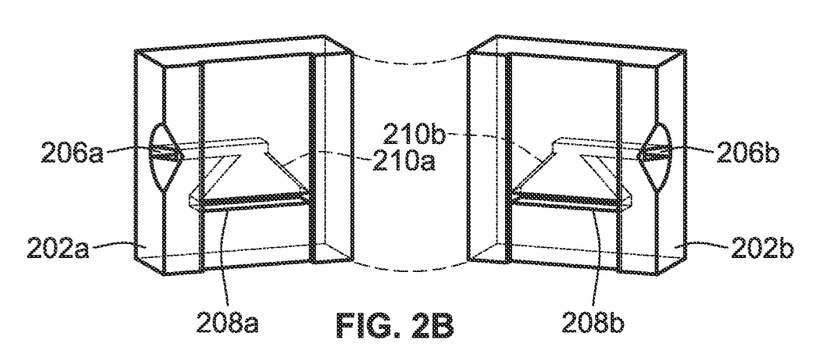
FIG. 2B illustrates an exploded view of the die assembly of FIG. 2A, with two die parts, according to aspects of the present disclosure.

Referring to FIGS. 2A-2D, a die 200 is illustrated that is used to apply the slurry 102 onto a substrate, according to aspects of the present disclosure. As shown in FIGS. 2A and 2B, the die 200 is formed of two die parts 202a, 202b. The die parts 202a, 202b can be symmetrical, as shown, or identical. Alternatively, the die parts 202a, 202b can be asymmetrical. Also, although the die parts 202a, 202b are shown and described as each being a single part, in one or more embodiments the die parts 202a, 202b can each be formed of multiple parts. The die parts 202a, 202b are configured to apply thin planar layers of the slurry 102 simultaneously on both sides of a substrate, as further described below. The die 200 includes an interface 204 (FIG. 2A) that is configured to connect the die 200 to one of the cylinders 104a, 104b or to the tube 108 (or to the third cylinder, if present). The interface 204 includes two slurry inlet ports 206a, 206b—one inlet port 206a, 206b for each die part 202a, 202b, respectively. The inlet ports 206a, 206b are configured to accept the slurry 102 extruded from the device 100, either from one of the cylinders 104a, 104b or from the tube 108, depending on where the die 200 is attached.

Referring to FIG. 2B, each die part 202a, 202b further includes a slurry outlet port 208a, 208b. The outlet ports 208a, 208b are configured to apply the slurry 102 evenly on a substrate as the substrate passes by the outlet ports 208a, 208b. The outlet ports 208a, 208b are approximately the same width as the substrate, but can be longer or shorter in width than the substrate.

Passages 210a, 210b, connect the outlet ports 208a, 208b to the inlet ports 206a, 206b. The inlet ports 206a, 206b are configured to divide the slurry 102 into two separate streams. Thereafter, the passages 210a, 210b are configured to evenly distribute the slurry 102 to the outlet ports 208a 208b for subsequent distribution of the slurry onto the substrate.

Figure 2C:
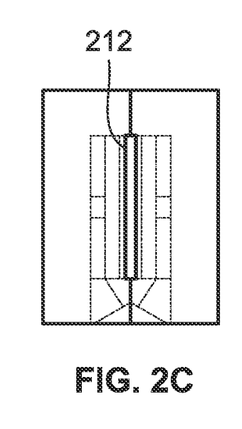
FIG. 2C illustrates a top view of the die assembly of FIG. 2A, according to aspects of the present disclosure.
Figure 2D:
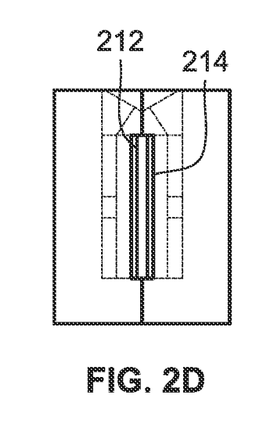
FIG. 2D illustrates a bottom view of the die assembly of FIG. 2A, according to aspects of the present disclosure.

Referring to FIGS. 2C and 2D, the die parts 202a, 202b coupled together to form the die 200 and define a slit 212 through the die 200. As described further below, the slit 212 allows a substrate to pass through the die 200. As the substrate passes through the die 200, slurry 102 extruded from the outlet ports 208a, 208b is applied simultaneously to both sides of the substrate passing through the slit 212.

Figure 3A:
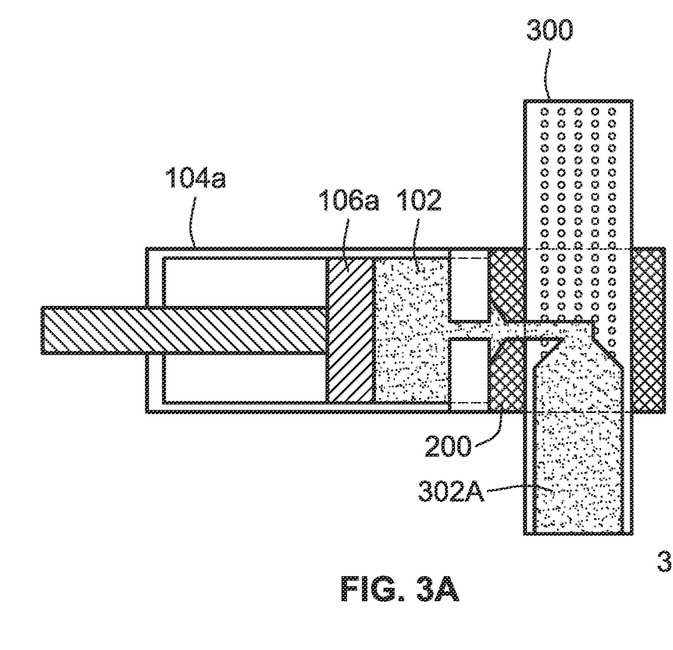
FIG. 3A illustrates a cross-sectional view of the device of FIG. 1 configured for applying the slurry onto a substrate, according to aspects of the present disclosure.

Referring to FIG. 3A, illustrated is a cross-sectional view of the device 100 configured for coating the slurry 102 onto a substrate 300, according to aspects of the present disclosure. The device 100 has been modified by disconnecting the tube 108 from the cylinder 104a. In place of the tube 108, the die 200 is connected to the cylinder 104a via the interface 204. However, in one or more embodiments, the die 200 can instead be connected to the tube 108 or the cylinder 104b (or a third cylinder). For example, the tube 108 may have an interface that connects to the interface 204 of the die 200. The ability to re-configure the device 100 from the mixing, kneading configuration of FIG. 1 to the application configuration of FIG. 3A allows for coating to be done simply and directly in situ without transferring the slurry 102 from one device (i.e., device 100) to another device.

Prior to connecting the die 200, as much of the slurry 102 as possible can be collected within the cylinder 104a. The slurry 102 within the cylinder 104a then is extruded from the cylinder 104a via actuation of the piston 106a. The extruded slurry 102 passes into the die 200 and is applied simultaneously to both sides of the substrate 300 from the outlet ports 208a, 208b. The substrate 300 can be any type of substrate, such as a substrate used in forming an electrode. For example, the substrate can be a foam, a mesh, or any type of porous, semi-porous, or non-porous material.

Figures 3B, 3C:
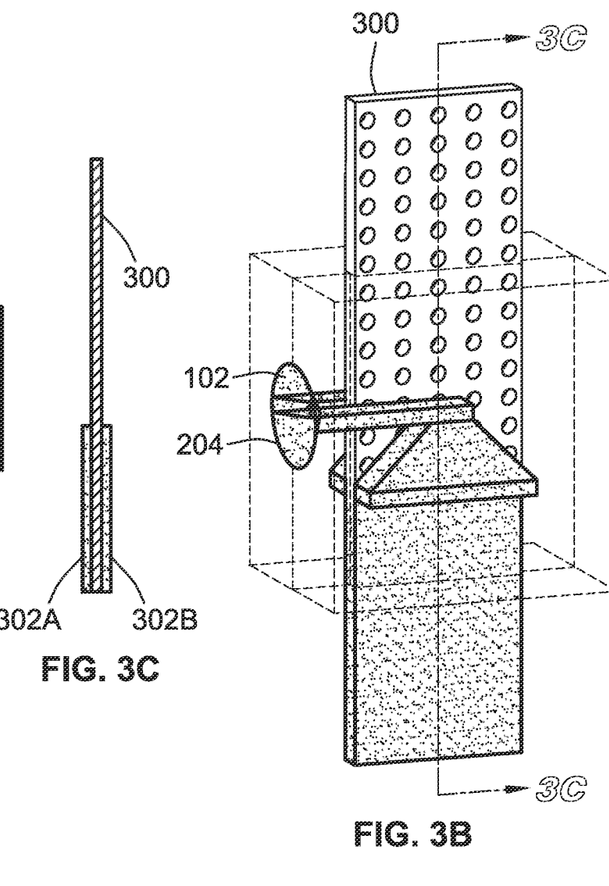
FIG. 3B illustrates an optically transparent perspective view of the die of FIG. 3A applying the slurry onto the substrate, according to aspects of the present disclosure.
FIG. 3C illustrates a cross-sectional view of the substrate of FIG. 3B, along the line 3B-3B, being coated with the slurry, according to aspects of the present disclosure.

FIG. 3B illustrates the slurry 102 passing into the inlet ports 206a, 206b, being directed into the passages 210a, 210b, out of the die 200 through the outlet ports 208a, 208b, and then onto the substrate 300. The pressure of the slurry 102 exiting the outlet ports 208a, 208b forces the slurry 102 into the substrate 300, such as into the pores of the substrate 300.

In one or more embodiments, the application of the slurry 102 onto the substrate 300 also causes the substrate 300 to advance through the die 200 through the slit 212. In other words, application of the slurry 102 onto the substrate 300 can move the substrate 300 in a desired direction, such as downward in the orientation of FIG. 3B. Alternatively, or in addition, the substrate 300 can be driven through the die 200 using another driving force, such as a take-up device (not shown).

FIG. 3C illustrates the applied slurry 102 on the substrate 300. Specifically, the slurry 102 forms thin films 302a, 302b on both sides of the substrate 300. The thin films can be about 8 μm to about 25 μm (micrometer) thick. Application of the thin films 302a, 302b according to the disclosed process results in an even thickness on both sides of the substrate 300. Moreover, the thickness can be controlled by the speed of the piston 106a during extrusion of the slurry 102 from the cylinder 104a, in combination with the speed of the substrate 300 passing through the slit 212 within the die 200.

In one or more embodiments, after mixing the slurry 102 but prior to coating the slurry 102 onto the substrate 300, the slurry 102 can be exposed to a vacuum within one or both of the cylinders 104a, 104b (or the third cylinder). The vacuum aids in removing gas within the slurry 102 before coating. Gas within the slurry 102 can affect surface evenness and adhesion of the resulting thin films 302a, 302b of the slurry 102 on the substrate 300. Thus, removal of the gas improves the evenness and adhesion of the slurry 102.

Figure 4:
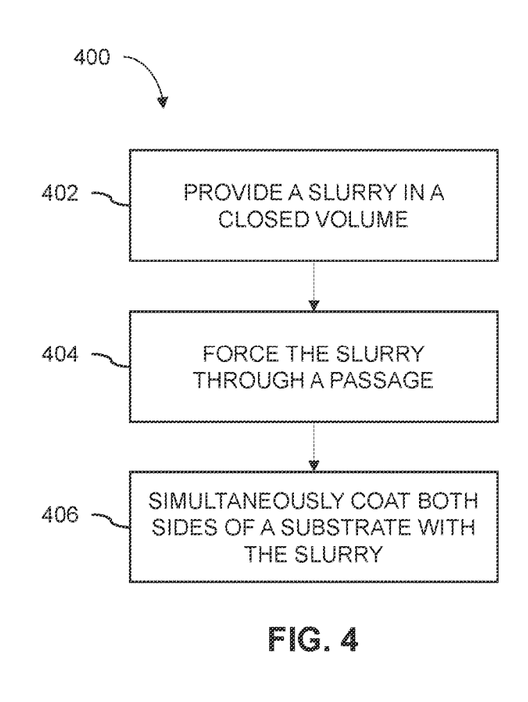
FIG. 4 is a flowchart of a process for coating a substrate, according to aspects of the present disclosure.

FIG. 4 is a flowchart of a process 400 for coating a substrate, according to aspects of the present disclosure. The process 400 is conducted using the device 100 disclosed above. The process 400 begins at step 402 with a slurry in the device 100. The device 100, as disclosed above, has a closed volume with at least one passage defined by the cylinders 104a, 104b and the tube 108. The slurry can be any slurry disclosed herein, and can contain a solvent, a powder, a binder, and a dispersion agent. In one or more embodiments, the slurry can lack the dispersion agent. As disclosed above, the binder in the slurry cannot exceed 10 wt % relative to the combined weight of the binder and the powder. The ratio of the water-based solvent to the powder in the slurry can be about 4.5-8:1 by weight. The amount of dispersion agent in the slurry can be as low as 0.01 wt %. However, the amount of dispersion agent, if any, within the slurry is generally about 1 to 2 wt %. As an example, the slurry can be formed of water as the solvent, carbon black as the powder, polytetrafluoroethylene emulsion as the binder, and an alcohol as the dispersion agent, although any component disclosed above can be used. Importantly, the slurry does not require n-methyl-2-pyrrolidone or another toxic dispersion agent based on the ability of the device 100 to create a dispersion out of the slurry without the toxic dispersion agents.

At step 404, the slurry is forced repeatedly under high pressure through the at least one passage in a first flow direction and then back through the at least one passage in a second flow direction, opposite the first flow direction, to homogenously disperse the powder and the binder within the solvent. As disclosed above, each of the two cylinders includes a piston, and a reciprocal actuation of the two pistons forces the slurry to flow in the first flow direction and the second flow direction. The cylinders are configured so that a cross section of the at least one passage is smaller than cross sections of the cylinders in stroke directions of the two pistons. This causes a high shear force on the slurry at it passes through the tube, which causes mixing of the slurry. For example, an inner diameter of each passage can be about $1/16$ inch to $1/2$ inch, and an inner diameter of the cylinders can be much larger, such as about 3 inches or more. In one or more embodiments, the inner diameter can be smaller than 3 inches depending on the speed of the pistons within the cylinders.

At step 406, both sides of a substrate are coated simultaneously with the slurry extruded from the closed volume. The coating can be a thin film of the slurry at a desired thickness, as discussed above. In one or more embodiments, prior to step 406 but after step 404, a vacuum can be applied to the slurry within the device 100 to remove gas that may have developed within the slurry during earlier process steps.

The solvents and dispersion agents used in forming the slurry allow for a different process of curing the slurry on the substrate than conventional processes. Specifically, because small portions of volatile organic solvents, such as alcohols mentioned above, are used to disperse hydrophobic materials, like the carbon powders, in a water dominant solution, it is possible to use a freeze-drying process to remove the solvents and dispersion agents and dry the coatings. The freeze-drying process decreases the possibility of issues found in conventional electrode manufacturing processes. These issues include uncontrollable deformations of pore structures and defects in morphologies and porosities of the thin films while drying.

Figure 5:
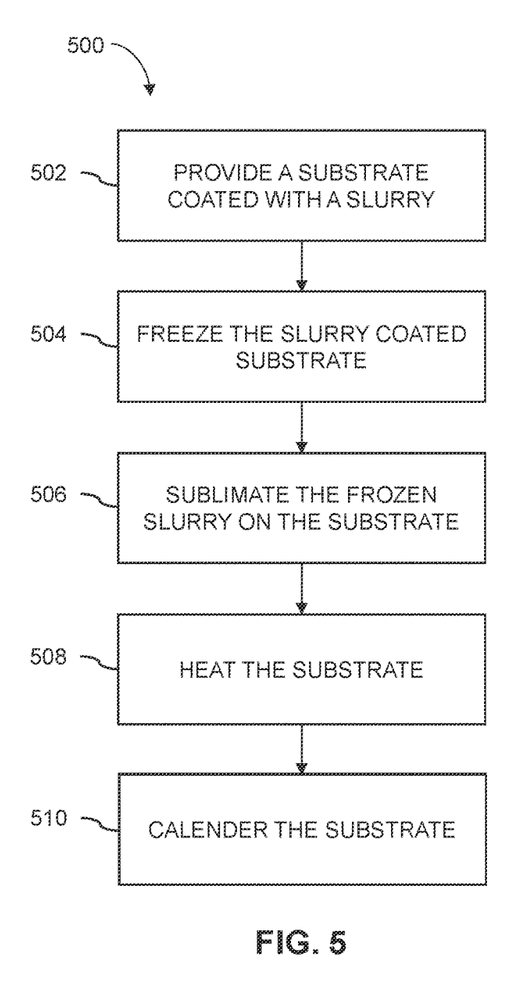
FIG. 5 is a flowchart of a process for curing a coated substrate, according to aspects of the present disclosure.

FIG. 5 is a flowchart of a process 500 for curing a coated substrate as a final product, according to aspects of the present disclosure. The process 500 begins at step 502 with a substrate coated on both sides with a slurry. The substrate can be coated according to the process 400 disclosed above, and the slurry can be any slurry based on the aspects of the present disclosure.

At step 504, the solvent and the dispersion agent coated on the substrate are frozen. The freezing can occur according to any process that reduces the temperature of the solvent and the dispersion agent to below their freezing points. However, in one or more embodiments, it is not necessary to freeze the dispersion agent when the amount of dispersion agent used is negligible relative to the amount of solvent, such as in the case of 1 wt % isopropyl alcohol in the current invention.

At step 506, after freezing the solvent and the dispersion agent, the solvent and the dispersion agent within the coated substrate are sublimated to freeze dry the substrate. Sublimation can occur according to any process that causes the solvent and the dispersion agent to sublimate.

At step 508, after sublimating the solvent and the dispersion agent, the substrate is heated in vacuum to above the standard freezing points of the solvent and the dispersion agent. The heating and vacuuming further aid in removing any remaining solvent and dispersion agent in the substrate.

At step 510, after the heating, the substrate is calendered. In one or more embodiments, the calendering includes cold calendering the substrate to stabilize the coating on the substrate. In one or more embodiments, the calendering also includes hot rolling the substrate after the cold calendering. The hot rolling can be about 100° C. to about 150° C. to improve the adhesion of the thin films on the substrate. In addition to improving adhesion, the hot rolling also increases the electrical conductivity through the improved adhesion.

Although it is possible to lose porosity within the thin films during the calendering, the properties of the pore structure of the thin films after freeze drying are still superior in terms of evenness and uniformity to pores for any coating made by the conventional methods in battery electrode manufacture. Thus, the coating method produces a uniform coating on a substrate having a porosity that is superior to porosity achieved by conventional methods heretofore. The coating is relatively defect-free compared to conventional approaches, producing a very low rate of pinholes, blisters, divots, barring, striping, foreign contaminants, exaggerated non-uniform coating areas, or agglomerates on the coating surfaces.

Thus, the methods and devices of the present disclosure lower the use or the amount of, or remove entirely, toxic materials in the formation of slurries, such as toxic solvents that cause undesirable vapors during the production of electrodes for batteries. Reduction or removal of the toxic materials reduces or eliminates specialty equipment required to prevent the release of the toxic materials into the environment and other issues, such as explosion. The methods and devices of the present disclosure also decrease the required work space needed for electrode manufacture as compared to conventional processes.

While the present disclosure relates discloses one or more particular embodiments, those skilled in the art will recognize that many changes may be made thereto without departing from the spirit and scope of the present invention. Each of these embodiment(s) and obvious variations thereof is contemplated as falling within the spirit and scope of the invention. It is also contemplated that additional embodiments according to aspects of the present invention may combine any number of features from any of the embodiments described herein.

What is claimed is:

1. A method comprising the steps of:
providing a slurry in a closed volume with at least one passage, the closed volume including two cylinders connected by the at least one passage, each of the two cylinders including a piston, the slurry including a solvent, a powder, a binder, and a dispersion agent selected for forming a battery cell electrode once applied to a substrate;
forcing the slurry repeatedly under high pressure to flow through the at least one passage in a first flow direction and then back through the at least one passage in a second flow direction, opposite the first flow direction, based on a reciprocal actuation of the two pistons of the two cylinders to homogenously disperse the powder and the binder within the solvent;
coating opposite sides of the substrate facing away from each other simultaneously with the slurry extruded from the closed volume after the forcing;
freezing at least the solvent and the dispersion agent coated on the substrate;
sublimating at least the solvent and the dispersion agent frozen on the substrate;
after the sublimating, heating the substrate under vacuum to above the standard freezing points of the at least one solvent and the dispersion agent;
calendering the substrate after the heating; and
forming the battery cell electrode with the substrate after the calendering,
wherein a ratio of the binder to the powder is about 0.02:1 to about 0.1:1 by weight,
wherein the powder is a carbon black powder, and a ratio of the solvent to the carbon black powder is about 4.5:1 to about 8:1 by weight,
wherein the slurry is about 0.01-2 wt % of the dispersion agent, and
wherein about 10 to 15 kWh of energy per kilogram of solid powder is required to form the dispersion of the powder and the binder in the slurry.

2. The method of claim 1, wherein the calendering comprises cold calendering the substrate to stabilize the coating on the substrate followed by hot rolling the substrate.

3. The method of claim 1, wherein a cross section in the first flow direction of each of the at least one passage is smaller than cross sections of the cylinders in stroke directions of the two pistons.

4. The method of claim 3, wherein a diameter of each of the at least one passage is 1/16 inch to 1/2 inch.

5. The method of claim 1, wherein the slurry lacks n-methyl-2-pyrrolidone.

6. The method of claim 1, wherein the solvent is water.

7. The method of claim 1, wherein the binder is a polytetrafluoroethylene emulsion.

8. The method of claim 1, wherein the dispersion agent is an alcohol.

9. The method of claim 1, further comprising applying a vacuum to the closed volume prior to the coating to remove gas from the slurry.

* * * * *